United States Patent
Wang et al.

(10) Patent No.: US 9,697,014 B2
(45) Date of Patent: Jul. 4, 2017

(54) ELECTRONIC APPARATUS AND METHOD FOR DETERMINING A RESET THEREOF

(71) Applicant: HTC Corporation, Taoyuan County (TW)

(72) Inventors: Chin-Yu Wang, Taoyuan County (TW); Chia-Jun Chia, Taoyuan County (TW); Te-Mu Chen, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 417 days.

(21) Appl. No.: 13/659,891

(22) Filed: Oct. 24, 2012

(65) Prior Publication Data
US 2014/0115311 A1 Apr. 24, 2014

(51) Int. Cl.
*G06F 9/445* (2006.01)
*G06F 9/44* (2006.01)
(Continued)

(52) U.S. Cl.
CPC ............ *G06F 9/445* (2013.01); *G06F 1/24* (2013.01); *G06F 9/4403* (2013.01); *G06F 11/3058* (2013.01)

(58) Field of Classification Search
CPC ............ G06F 11/1441; G06F 11/1417; G06F 11/2284; G06F 21/575; G06F 1/24; G06F 9/4403; G06F 12/0891; G06F 9/445
See application file for complete search history.

(56) References Cited

U.S. PATENT DOCUMENTS 5,576,650 A * 11/1996 Hirotani .................... G06F 1/24
327/142
5,638,021 A 6/1997 Kaifler et al.
(Continued)

FOREIGN PATENT DOCUMENTS

CN 1127375 7/1996
CN 101321344 12/2008
(Continued)

OTHER PUBLICATIONS

"Office Action of Taiwan Counterpart Application", issued on Nov. 12, 2014, p. 1-p. 9.
(Continued)

*Primary Examiner* — Jaweed A Abbaszadeh
*Assistant Examiner* — Wai Yip
(74) *Attorney, Agent, or Firm* — Jianq Chyun IP Office

(57) ABSTRACT

An electronic apparatus and method for determining a reset thereof are provided. The electronic apparatus includes a switch, a sensor, a reset circuitry and a control circuitry. The switch generates a trigger signal as being triggered. The sensor senses a property of an object or an environment external to the electronic apparatus and to provide a sensing information based on the sensed property. The reset circuitry is coupled to the switch and counts from an initial value to a predetermined value when keep receiving the trigger signal from the switch, wherein the reset circuitry further resets the electronic apparatus when counting to the predetermined value. The control circuitry is coupled to the switch, the sensor and the reset circuit and generates a control signal, based on the sensing information, for controlling the reset circuit to re-count from the initial value to the predetermined value.

28 Claims, 5 Drawing Sheets

(51) Int. Cl.
*G06F 1/24* (2006.01)
*G06F 11/30* (2006.01)

(56) References Cited

U.S. PATENT DOCUMENTS

| | | | | |
|---|---|---|---|---|
| 7,990,190 | B2 * | 8/2011 | Kaidoh | H03K 17/20 |
| | | | | 327/142 |
| 8,180,327 | B2 * | 5/2012 | Yang | H04M 1/66 |
| | | | | 345/156 |
| 2010/0060331 | A1 | 3/2010 | Xiao et al. | |
| 2011/0012651 | A1 | 1/2011 | Kaidoh et al. | |
| 2011/0159849 | A1 | 6/2011 | Yang | |
| 2011/0312385 | A1 | 12/2011 | Lee | |

FOREIGN PATENT DOCUMENTS

| | | |
|---|---|---|
| CN | 101827160 | 9/2010 |
| CN | 102681736 | 9/2012 |
| EP | 0679981 | 8/2001 |
| JP | 2004140457 | 5/2004 |

OTHER PUBLICATIONS

"Office Action of Taiwan Counterpart Application", issued on Apr. 7, 2015, p. 1-p. 5.
"Office Action of China Counterpart Application", issued on Sep. 18, 2016, p. 1-p. 9.
"Office Action of China Counterpart Application", issued on Jan. 26, 2016, p. 1-p. 9.
"Office Action of German Counterpart Application", issued on Jan. 31, 2017, p. 1-p. 10.

* cited by examiner

ELECTRONIC APPARATUS AND METHOD FOR DETERMINING A RESET THEREOF

BACKGROUND

Field of the Invention

The invention relates to an electronic apparatus, and more particularly to an electronic apparatus could prevent being accidentally reset.

Description of Related Art

Nowadays, various electronic devices have become a very important part of people's life. For example, devices such as the smartphone, tablet, notebook and personally digital assistant (PDA) become one of the most frequently used products for the provided convenience.

Most of the electronic devices have a power button for the user to turn on/off the electronic devices. However, when an electronic device is placed in a crowded environment (e.g., a bag which is full of stuffs), the power button may be squeezed to accidentally trigger the power management mechanism of the electronic device. In general, the electronic device usually has a mechanism to reset itself when its power button has been triggered over a predetermined duration to solve some crash situation. Therefore, the electronic device may be accidentally reset when its power button has been continuously triggered over the predetermined duration. After the electronic device being accidentally reset, the electronic device may perform an authentication procedure and wait for the user to enter authentication codes (e.g., a SIM card password). Since the user has no idea that the electronic device needs the user to enter the authentication codes, the electronic device may stuck in the authentication procedure and cannot normally provide services, which brings inconvenience to the user.

SUMMARY

Accordingly, the present invention is directed to an electronic apparatus that incorporates the sensed factors of the environment to prevent the electronic apparatus being accidentally reset.

An electronic apparatus is introduced herein. The electronic apparatus includes a switch, a sensor, a reset circuitry and a control circuitry. The switch, configured to generate a trigger signal as being triggered. The sensor is configured to sense a property of an object or an environment external to the electronic apparatus and to provide a sensing information based on the sensed property. The reset circuitry is coupled to the switch and configured to count from an initial value to a predetermined value when keep receiving the trigger signal from the switch, wherein the reset circuitry is further configured to reset the electronic apparatus when counting to the predetermined value. The control circuitry is coupled to the switch, the sensor and the reset circuit and configured to generate a control signal, based on the sensing information, for controlling the reset circuit to re-count from the initial value to the predetermined value.

A method for determining a reset of an electronic apparatus is introduced herein. The method includes the following steps: generating a trigger signal; counting from an initial value to a predetermined value when keep receiving the trigger signal; resetting the electronic apparatus when counting to the predetermined value; sensing a property of an object or an environment external to the electronic apparatus; providing a sensing information based on the sensed property; and generating a control signal based on the sensing information for re-counting from the initial value to the predetermined value.

Based on the above description, the embodiments of the present invention provide effective mechanism for preventing the electronic apparatus from being accidentally reset by incorporating the sensing information provided by the sensor.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
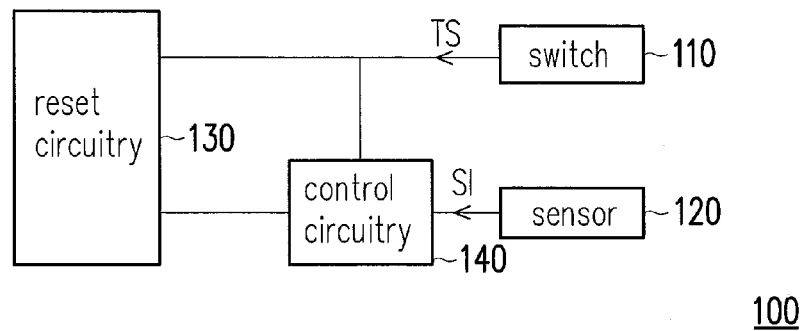
FIG. 1 is a functional block diagram illustrating an electronic apparatus according to an exemplary embodiment of the present invention.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

FIG. 1 is a functional block diagram illustrating an electronic apparatus according to an exemplary embodiment of the present invention. In this embodiment, the electronic apparatus 100 includes a switch 110, a sensor 120, a reset circuitry 130 and a control circuitry 140. The switch 110 is configured to generate a trigger signal TS as being triggered. The switch 110 may be a button (e.g., a power button), which can be triggered through being pressed by a user. The electronic apparatus 100 may be in a powered-on status such as sleep mode, wake up mode, active mode, standby mode or the like. The sleep mode refers to a low power mode for electronic apparatus 100. The display of the electronic apparatus 100 may be deactivated. These modes may consume less power compared to a fully activated status of the display of the electronic apparatus 100. Besides, when the electronic apparatus 100 is resumed, the user is allowed to avoid the need to reissue instructions. The user may place the electronic apparatus 100 in the pocket when the electronic apparatus 100 is in the sleep mode.

The sensor 120 may be configured to sense a property of an object or an environment external to the electronic apparatus 100 and to provide sensing information SI based on the sensed property. The sensor 120 may include one or a combination of the following sensors, for example, a light sensor, a gravity sensor, a global positioning system sensor, a proximity sensor, a camera sensor and a touch sensor, but the invention is not limited thereto. With the aforementioned sensors, the detectable property of the object or the environment may corresponding include one or a combination of a pressure being applied to the electronic apparatus 100, such as a direction of gravity related to the electronic apparatus 100, a light shining the electronic apparatus 100, a position of the electronic apparatus 100, a distance between the electronic apparatus 100 and other things (e.g., the user), an acceleration of the electronic apparatus 100, a speed of the electronic apparatus 100, a temperature of the environment where the electronic apparatus 100 is in, a touch event occurs at the electronic apparatus 100 and an image taken by the electronic apparatus 100, but the invention is not limited thereto.

For example, when the sensor 120 senses the pressure being applied to the electronic apparatus 100, the sensor 120 may correspondingly outputs the sensing information SI to indicate that the electronic apparatus 100 may be currently pressed. On the other hand, when the sensor 120 does not sense the property, the sensor 120 may not output any signal or information. For another example, the user would not operate the electronic apparatus 100 in a place with insufficient light. Therefore, when the sensor 120 (e.g., a light sensor) senses that the light of the environment around the electronic apparatus 100 is insufficient, the sensor 120 may provide the sensing information SI for indicating that the electronic apparatus 100 may currently be in a situation of insufficient light. The light sensor may be an ambient light sensor, which adopts a photodiode for sensing the ambient light. A photodiode is a type of photo detector capable of converting light into a voltage or current. In general, the light sensor generates an electrical signal such as a voltage signal according to the intensity of the detected light. The light sensor then sends the generated electrical signal via an analog line to the analog-to-digital converter (ADC), which converts the analog electrical signal to a corresponding digital signal. The ADC then sends the corresponding digital signal or sensing information SI to the control circuitry 140 via a digital line. The control circuitry 140 uses the digital signal or sensing information SI to generate a brightness signal representative of the ambient brightness. When the brightness signal is below a predetermined threshold, the control circuitry 140 registers a condition with no light.

The reset circuitry 130 is coupled to the switch 110 and configured to count from an initial value to a predetermined value when keep receiving the trigger signal TS from the switch 110. That is, the reset circuitry 130 starts counting when the switch 110 is pressed and the reset circuitry 130 keep receiving the trigger signal TS. For example, the switch 110 may be a button and being continually pressed by the user, and hence the switch 110 may correspondingly keep transmitting the trigger signal TS to the reset circuitry 130. When the reset circuitry 130 receives the trigger signal TS, the reset circuitry 130 may start timing the duration of the trigger signal TS. When the reset circuitry 130 counts from an initial value (e.g., 0 second) to the predetermined value (e.g., 6 seconds), the reset circuitry 130 may reset the electronic apparatus 100. On the other hand, if the triggering status of the switch 110 disappears before counting to the predetermined value, the reset circuitry 130 would not reset the electronic apparatus 100. In some embodiments, the reset circuitry 130 stops timing the duration of the trigger signal TS when the switch is released.

Therefore, when the user wants to reset the electronic apparatus 100, the user may keep pressing the power button (i.e., the switch 110) until the counted duration of the trigger signal TS reaches the predetermined value (e.g., 6 seconds), such that the electronic apparatus 100 may be correspondingly reset by the reset circuitry 130. However, since the switch 110 may be accidentally triggered, the electronic apparatus 100 may determine whether the user really wants to press the switch 110 to reset the electronic apparatus 100 or the user press on the switch 110 by accident. The accidentally press on the button might happen when the user put the electronic apparatus 100 in the pocket of a trouser. As the user sit down, the pelvis bone and thigh bone is pivoted to form an angle and the pelvis bone may press against the switch 110 and result an accidental press of the switch 110. Therefore, the electronic apparatus 100 may determine condition of the press of the switch 110 by simultaneously considering the information provided by the sensor 120 and the control circuitry 140.

The control circuitry 140 is coupled to the switch 110, the sensor 120 and the reset circuit 130. When the control circuitry 140 receives the sensing information SI, the control circuitry 140 may generate a control signal, and the control signal may be configured for controlling the reset circuit 130 to re-count from the initial value to the predetermined value.

In detail, the switch 110 may be accidentally triggered when the electronic apparatus 100 is put in, for example, a pocket of the user. After the control circuitry 130 receives the trigger signal TS from the switch 110, the control circuitry 130 may activate the sensor 120. The sensor 120 starts sensing the environment and transmitting the sensing information SI to the control circuitry 140. That is, the sensor 120 may start to sense, for example, a pressure or a status of no light. Hence, the sensor 120 may transmit the sensing information SI for indicating that the switch 110 is probably being accidentally pressed. For example, when the sensor 120 is a light sensor, the light sensor may start to detect whether the environment of the electronic apparatus 100 has sufficient light under the control of the control circuitry 130. When the environment has insufficient light, the sensor 110 may generate the corresponding sensing information SI for indicating this situation.

The sensing information SI may be an electrical signal as a function of the property of an object sensed by the sensor 120 or the environment external to the electronic apparatus 100 imposed on the sensor 120. Herein, if the timing of the trigger signal TS is not stopped in time, there may occur unexpected reset on the electronic apparatus 100. The situation of the unexpected reset may be avoided by the control signal, which is generated by the control circuitry 140.

In other words, when the switch 110 is triggered, the reset circuitry 130 would simultaneously determine whether an inadvertently pressing situation occurs according to the sensing information SI provided by the sensor 120. When the sensing information SI reflects that the inadvertently pressing situation may currently occur to the switch 110, the reset circuitry 130 would stop timing the trigger signal TS and start to re-count from the initial value to the predetermined value. As a result, the probability of the unexpected reset may be significantly reduced by the embodiment of the invention. In addition, the user experience of operating the electronic apparatus 100 would also not be negatively affected.

Figure 2:
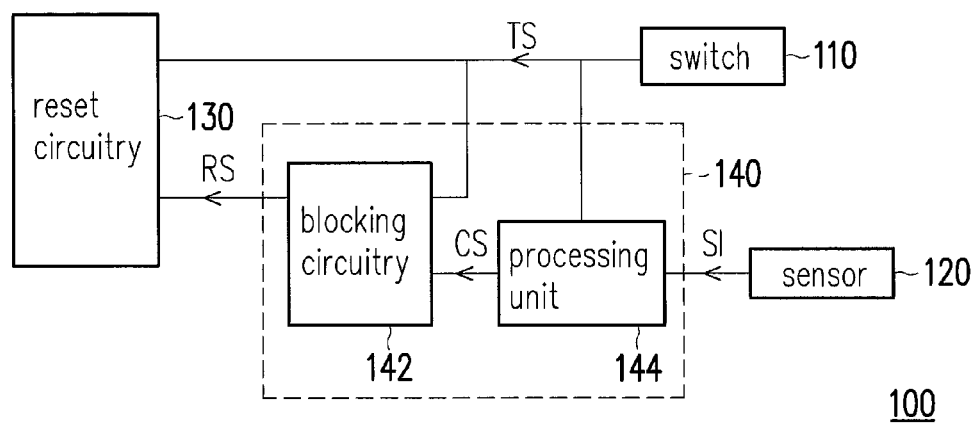
FIG. 2 is a functional block diagram illustrating another example of the electronic apparatus.

FIG. 2 is a functional block diagram illustrating another example of the electronic apparatus. In this embodiment, the control circuitry 140 includes a blocking circuitry 142 and a processing unit 144. The blocking circuitry 142 is coupled to the switch 110, the reset circuitry 130 and the processing unit 144. The processing unit 144 is coupled to the sensor 120 and the switch 110, and configured for generating the control signal CS according to the sensing information SI and the trigger signal TS. In some embodiments, the processing unit 144 may control the sensor 120 to provide the sensing information SI after receiving the trigger signal TS of the switch 110. The processing unit 144 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like. In some embodiments, the processing unit 144 may output the control signal CS through a general purpose input output (GPIO) pin, and the control signal CS may be a toggle signal, which includes at least one signal edge. Or, the control signal CS may also be other kind of electrical signals, which is not limited thereto.

The blocking circuitry 142 may generate a reset signal RS in response to the control signal CS. In other words, the reset signal RS may be configured for controlling the reset circuit 130 to re-count from the initial value to the predetermined value. From another aspect, after receiving the trigger signal TS, the blocking circuitry 142 may further take the control signal CS into account to determine whether to send the reset signal RS to the reset circuitry 130. When the reset circuitry 130 receives the reset signal RS, which reflects that an inadvertently triggering situation to the switch 110 has occurred, the reset circuitry 130 would accordingly recount from a initial value, such that the counting of the reset circuitry would not reach the predetermined value (e.g., 6 seconds) to reset the electronic apparatus 100.

Figure 3:
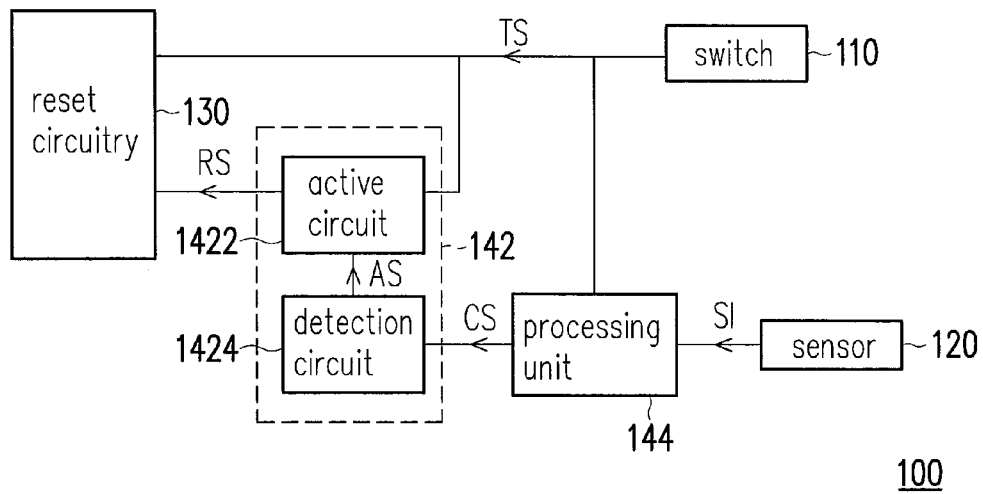
FIG. 3 is a functional block diagram illustrating an electronic apparatus according to the embodiment of FIG. 2.

FIG. 3 is a functional block diagram illustrating an electronic apparatus according to the embodiment of FIG. 2. In this embodiment, the blocking circuitry 142 includes an active circuit 1422 and a detection circuit 1424. The active circuit 1422 is coupled to the reset circuitry 130, the switch 110 and the detection circuit 1424. The detection circuit 1424 is coupled to the processing unit 144 and configured to generate an active signal AS in response to the control signal CS. When the active signal AS is received by the active circuit 1422, the active circuit 1422 may accordingly generate the reset signal RS and send the reset signal RS to the reset circuitry 130 to reset the counting of the reset circuitry back to initial value and restart counting again.

Figure 4:
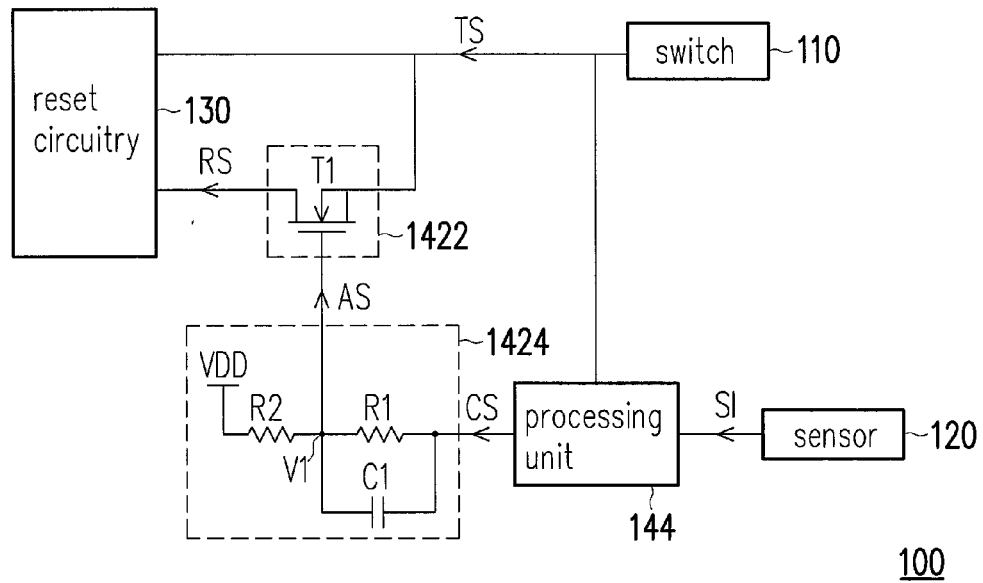
FIG. 4 is a functional block diagram illustrating an electronic apparatus according to the embodiment of FIG. 3.

FIG. 4 is a functional block diagram illustrating an electronic apparatus according to the embodiment of FIG. 3. In this embodiment, the active circuit 1422 includes a transistor T1, and the detection circuit 1424 includes a capacitor C1 and resistors R1-R2. The first terminal of the transistor T1 is coupled to the reset circuitry 130, and the second terminal of the transistor T1 is coupled to the switch 110. The first terminal of the resistor R1 is coupled to the processing unit 144, and the second terminal of the resistor R1 is coupled to the control terminal of the transistor T1. The first terminal of the resistor R2 is coupled to the second terminal of the resistor R1, and the second terminal of the resistor R2 is coupled to a predetermined voltage (e.g. VDD). The first terminal of the capacitor C1 is coupled to the first terminal of the resistor R1, and the second terminal of the capacitor C1 is coupled to the second terminal of the resistor R1.

When the electronic apparatus 100 is normally operating, the transistor T1 would be switched on with the predetermined voltage VDD, such that the trigger signal TS can be transported to the reset circuitry 130 through the transistor T1 and generates the reset signal RS. When a reset block of the reset circuitry 130 receives the trigger signal TS from the path with the transistor T1, the reset circuitry 130 may start counting from an initial value to predetermine value.

In some embodiments, the control signal CS may be the toggle signal with a special pattern, such as an inverted square pulse (i.e., a pulse signal with high-low-high levels). That is, after receiving the sensing information SI, the processing unit 144 may output the inverted square pulse to the first terminal of the resistor R1 through, for example, the GPIO pin. Since the capacitor C1 may temporarily resist the voltage variation between its two terminals, the voltage of a node V1 may be correspondingly pulled down to a low voltage level at the first signal edge of the inverted square pulse (which is a falling edge). At this time, the transistor T1 would be temporarily switched off by the low voltage of the node V1. As a result, the transistor T1 will not generate reset signal RS to the reset circuitry 130 by not transporting the trigger signal TS through the transistor T1. When the reset circuitry 130 receive the reset signal RS from the path with the transistor T1, the reset circuitry 130 would know that the switch 110 may be triggered by accident and starts to re-count from the initial value.

In other embodiments, the control signal CS may also be other kind of signals that may control the detection circuit 1424 to temporarily turn off the transistor T1, so that the reset signal RS is not generated to be transmitted to the reset circuitry.

From another aspect, the detection circuit 1424 provides the active signal AS to the transistor T1 by temporarily pull down the voltage level of the node V1, and the active circuit 1422 provides the reset signal RS by temporarily disconnect the transporting path of the trigger signal TS.

In short, during the reset circuitry 130 timing the duration of the trigger signal TS, if the sensing information SI reflects that the switch 110 may be triggered by accident, the processing unit 144 would output the toggle signal (e.g., the inverted square pulse) to temporarily switch off the transistor T1. Hence, the reset circuitry 130 would re-count the duration of the trigger signal TS when the trigger signal TS is not received from the path with the transistor T1.

Figure 5:
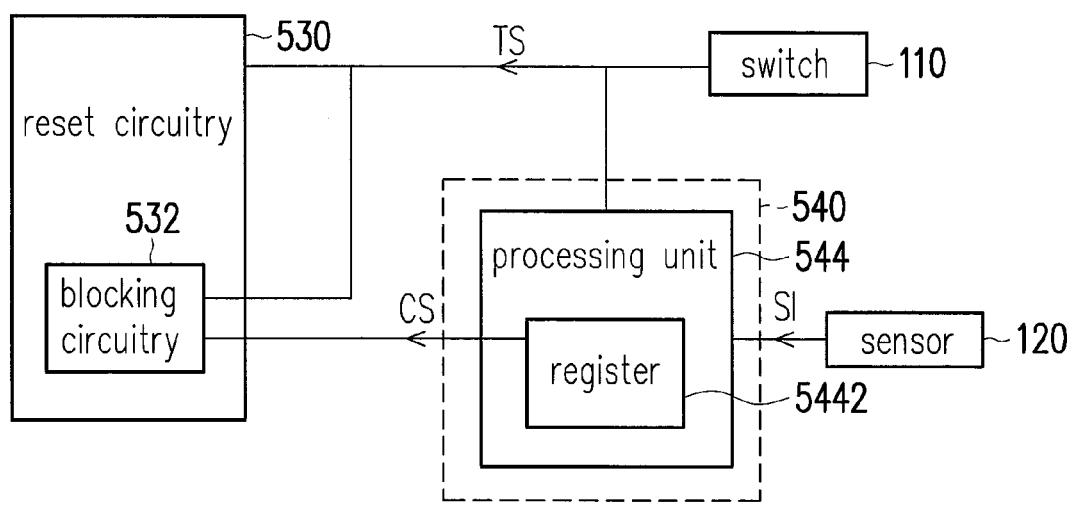
FIG. 5 is a functional block diagram illustrating an electronic apparatus according to an exemplary embodiment of the present invention.

FIG. 5 is a functional block diagram illustrating an electronic apparatus according to an exemplary embodiment of the present invention. The embodiment of FIG. 5 may refer to the description of FIG. 1 to FIG. 4. The difference between this embodiment and the aforementioned embodiments of FIG. 1 to FIG. 4 is that a blocking circuitry 532 is included in a reset circuitry 530 instead of being included in a control circuitry 540. Furthermore, the control circuitry 540 includes a processing unit 544. The processing unit 544 includes a register 5442, which may be toggled by the processing unit 544 to generate the control signal CS in response to the sensing information SI provided by the sensor 120. The control signal CS may include two different voltage levels, which are not limited thereto.

That is, the blocking circuitry 532 may be integrated within the reset circuitry 530. In another point of view, the reset circuitry 530 may take the control signal CS and the trigger signal TS into consideration at the same time, and accordingly determine whether to re-count the duration of the trigger signal TS for avoiding the electronic apparatus 500 being accidentally reset.

Figure 6:
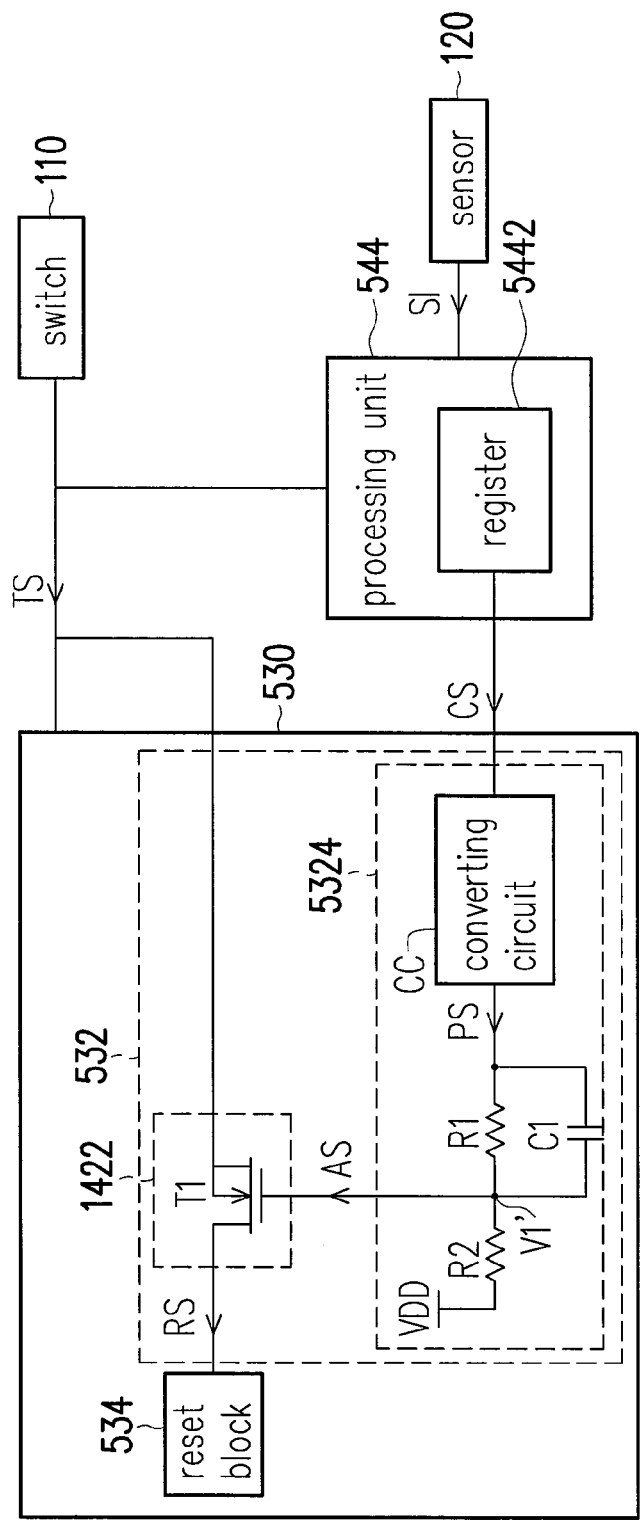
FIG. 6 is a functional block diagram illustrating an electronic apparatus according to the exemplary embodiment of FIG. 5.

FIG. 6 is a functional block diagram illustrating an electronic apparatus according to the exemplary embodiment of FIG. 5. In this embodiment, the blocking circuitry 532 includes the active circuit 1422 and a detection circuit 5324. The detection circuit 5324 includes all the elements of the detection circuit 1424 of FIG. 4, and further includes a converting circuit CC. The converting circuit CC is coupled to the first terminal of the resistor R1, and is coupled to the register 5442 through a control bus. The control bus may be, for example, inter-integrated circuit (I2C), which is not limited thereto. The converting circuit CC may generate a pulse signal PS in response to the control signal CS from the register 5442.

Besides, the active circuit 1422 is further coupled to a reset block 534, and the reset block 534 may be configured for resetting the electronic apparatus 500 when counting to the predetermined value. As illustrated in FIG. 4, the active circuit 1422 may include the transistor T1, where the first terminal of the transistor T1 may be coupled to the reset block 534, the second terminal of the transistor T1 may be coupled to the switch 110, and the control terminal of the transistor T1 may be coupled to the node V1'.

The pulse signal PS may also be an inverted square pulse (i.e., a pulse signal with high-low-high levels), such that the voltage level at a node V1' may correspondingly vary. As mentioned in the embodiment of FIG. 4, the voltage variation at the node V1' may be regarded as providing the active signal AS to the active circuit 1422. With the active signal AS, the active circuit 1422 may also generate the reset signal RS to control the reset block 534 of the reset circuitry 530 to re-count the duration of the trigger signal TS.

Figure 7:
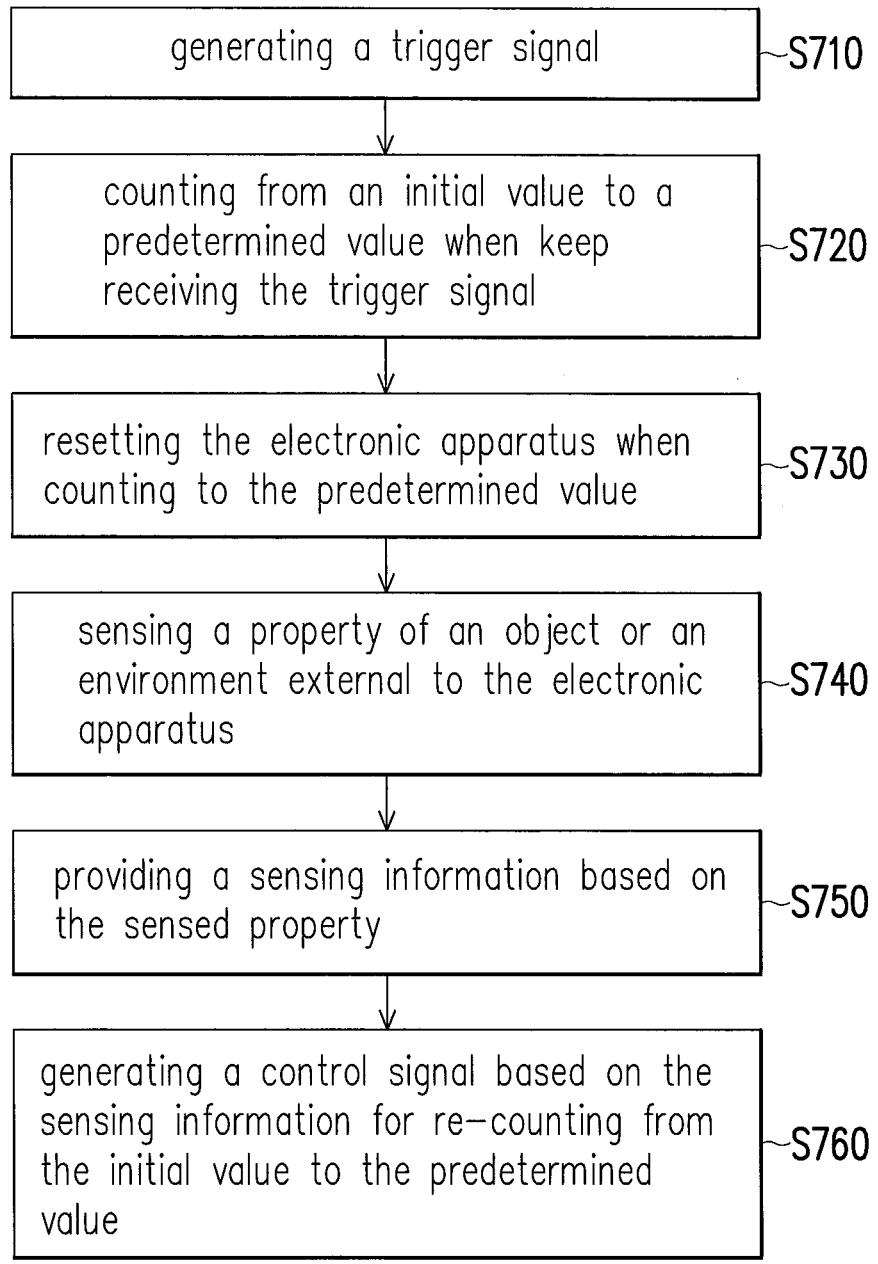
FIG. 7 is a flow chart illustrating a method for determining a reset of an electronic apparatus according to an exemplary embodiment of the present invention.

FIG. 7 is a flow chart illustrating a method for determining a reset of an electronic apparatus according to an exemplary embodiment of the present invention. Referring to both FIG. 1 and FIG. 7, the proposed method for determining a reset of an electronic apparatus may be adapted for the foregoing electronic apparatus 100, but the invention is not limited thereto. In step S710, the switch 110 generates a trigger signal TS as being triggered. In step S720, the reset circuitry 130 counts from an initial value to a predetermined value when keep receiving the trigger signal TS, and when counting to the predetermined valued, the reset circuitry 130 resets the electronic apparatus 100 in step S730. In step S740, the sensor 120 senses a property of an object or an environment external to the electronic apparatus 100, and the sensor 120 provides sensing information SI based on the sensed property in step S750. In step S760, the control circuitry 140 generates a control signal based on the sensing information SI for re-counting from the initial value to the predetermined value.

To sum up, the embodiments of the present invention provide mechanism for reducing the probability of the electronic apparatus being accidentally reset. By incorporating the sensing information provided by the sensor, the reset circuitry could further consider the environment where the electronic apparatus is, instead of solely considering whether the switch is triggered. Specifically, when the switch is triggered and the electronic apparatus is in a situation that the electronic apparatus is not likely to be intentionally reset (e.g., in a pocket or a bag), the reset circuitry may adaptively re-count the duration of the trigger signal to prevent the electronic apparatus being accidentally reset. Therefore, the user experience of operating the electronic apparatus would be improved since the probability of the electronic apparatus being inadvertently reset is significantly decreased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. An electronic apparatus, comprising:
a switch, configured to generate a trigger signal as being triggered;
a sensor, configured to sense a property of an object or an environment external to the electronic apparatus and to provide a sensing information based on the sensed property;
a reset circuitry, coupled to the switch and configured to count from an initial value to a predetermined value when keep receiving the trigger signal from the switch, wherein the reset circuitry is further configured to reset the electronic apparatus when counting to the predetermined value; and
a control circuitry, coupled to the switch, the sensor and the reset circuit and configured to generate a control signal based on the sensing information when keep receiving the trigger signal from the switch,
wherein the reset circuitry is configured to re-count from the initial value based on the control signal.
2. The electronic apparatus as claimed in claim 1, wherein the switch is a button and triggered by being pressed.
3. The electronic apparatus as claimed in claim 1, wherein the sensing information is an electrical signal as a function of the property of an object sensed by the sensor or the environment external to the electronic apparatus imposed on the sensor.
4. The electronic apparatus as claimed in claim 1, wherein the property of the object or the environment comprises one or a combination of a pressure, a direction of gravity, a light, a position, a distance, an acceleration, a speed, a temperature, a touch event and an image.
5. The electronic apparatus as claimed in claim 1, wherein the sensor comprises one or a combination of a light sensor, a gravity sensor, a global positioning system sensor, a proximity sensor, a camera sensor and a touch sensor.
6. The electronic apparatus as claimed in claim 1, wherein the control circuitry comprises a blocking circuitry and a processing unit and wherein the blocking circuitry coupled to the reset circuitry, the processing unit and the switch, and the processing unit is coupled to the sensor and the switch, wherein the processing unit generates the control signal when receiving the sensing information and the trigger signal and the blocking circuitry generates a reset signal to control the reset circuit to re-count from the initial value to the predetermined value when keep receiving the control signal and the trigger signal.
7. The electronic apparatus as claimed in claim 6, wherein the blocking circuitry comprises a detection circuit coupled with the processing unit and an active circuit coupled with the detection circuit, the switch and the reset circuitry, wherein the detection circuit generates an active signal when the detection circuit receives the control signal, and the active circuit generates the reset signal when the active circuit receives the active signal and the trigger signal.

8. The electronic apparatus as claimed in claim 7, wherein the control signal comprises at least one signal edge.

9. The electronic apparatus as claimed in claim 8, wherein the detection circuit generates the active signal to the active circuit after receiving the control signal having at least one signal edge.

10. The electronic apparatus as claimed in claim 7, wherein the detection circuit comprises:
a first resistor, having a first terminal coupled to the processing unit and a second terminal coupled to the active circuit;
a capacitor, having a first terminal coupled to the first terminal of the first resistor and a second terminal coupled to the second terminal of the first resistor; and
a second resistor, having a first terminal coupled to the second terminal of the first resistor and a second terminal coupled to a predetermined voltage,
wherein the detection circuit receives the control signal through the first terminal of the first resistor and generates the active signal through the second terminal of the first resistor.

11. The electronic apparatus as claimed in claim 7, wherein the active circuit comprises a transistor, wherein a first terminal of the transistor is coupled to the reset circuitry, a second terminal of the transistor is coupled to the switch and a control terminal of the transistor is coupled to the detection circuit,
wherein when the control terminal of the transistor receives the active signal and the second terminal of the transistor receives trigger signal, the transistor is switched on to generate the reset signal.

12. The electronic apparatus as claimed in claim 1, wherein the control circuitry comprises a processing unit and the reset circuitry comprises a blocking circuitry, wherein the blocking circuitry coupled to the processing unit and the switch, and the processing unit is coupled to the sensor and the switch, wherein the processing unit generates the control signal based on the sensing information and the trigger signal and the blocking circuitry controls the reset circuitry to re-count from the initial value to the predetermined value when receiving the control signal and the trigger signal.

13. The electronic apparatus as claimed in claim 12, wherein the processing unit further comprises a register to generate the control signal.

14. The electronic apparatus as claimed in claim 13, wherein the register is toggled by the processing unit to generate the control signal, which has a first voltage level and a second voltage level, wherein the first voltage level is different from the second voltage level.

15. The electronic apparatus as claimed in claim 14, wherein the blocking circuitry further comprises a detection circuit coupled to the processing unit and an active circuit coupled to the detection circuit and the switch.

16. The electronic apparatus as claimed in claim 15, wherein the detection circuit further comprises a converting circuit to generate a pulse signal based on the first voltage level and the second voltage level of the control signal, wherein the converting circuit is coupled to the register by a control bus, and wherein the pulse signal has at least one signal edge.

17. The electronic apparatus as claimed in claim 16, wherein when the converting circuit receives the control signal, the converting circuit generates the pulse signal having at least one signal edge and the detection circuit generates an active signal based on the pulse signal, and when the active circuit receives the active signal, the active circuit generates the reset signal.

18. The electronic apparatus as claimed in claim 17, wherein the detection circuit comprises:
a first resistor, having a first terminal coupled to the converting circuit and a second terminal coupled to the active circuit;
a capacitor, having a first terminal coupled to the first terminal of the first resistor and a second terminal coupled to the second terminal of the first resistor; and
a second resistor, having a first terminal coupled to the second terminal of the first resistor and a second terminal coupled to a predetermined voltage,
wherein the converting circuit receives the control signal and generates the pulse signal and transmits the pulse signal through the first terminal of the first resistor and generates the active signal through the second terminal of the first resistor.

19. The electronic apparatus as claimed in claim 18, wherein the active circuit comprises a transistor, wherein a first terminal of the transistor is coupled to a reset block of the reset circuitry, a second terminal of the transistor is coupled to the switch and a control terminal of the transistor is coupled to the detection circuit,
wherein the reset block is configured for resetting the electronic apparatus when counting to the predetermined value,
wherein when the control terminal of the transistor receives the active signal and the second terminal of the transistor receives trigger signal, the transistor is switched on to generate the reset signal.

20. A method for determining a reset of an electronic apparatus, comprising the following steps:
generating a trigger signal;
counting from an initial value to a predetermined value when keep receiving the trigger signal;
resetting the electronic apparatus when counting to the predetermined value;
sensing a property of an object or an environment external to the electronic apparatus;
providing a sensing information based on the sensed property;
generating a control signal based on the sensing information when keep receiving the triggering signal; and
re-counting from the initial value based on the control signal.

21. The method as claimed in claim 20, wherein the sensing information is an electrical signal as a function of the property of an object sensed by the sensor or the environment external to the electronic apparatus imposed on the sensor.

22. The method as claimed in claim 20, wherein the property of the object or the environment comprises one or a combination of a pressure, a direction of gravity, a light, a position, a distance, an acceleration, a speed, a temperature, touch and an image.

23. The method as claimed in claim 20, wherein before the step of re-counting from the initial value to the predetermined value, further comprising:
generating a reset signal to re-count from the initial value to the predetermined value when keep receiving the control signal and the trigger signal.

24. The method as claimed in claim 20, wherein before the step of re-counting from the initial value to the predetermined value based on the sensing information, further comprising:

generating an active signal when the control signal is received; and generating the reset signal after the active signal is received.

25. The method as claimed in claim 24, wherein the control signal comprises at least one signal edge, configured for triggering the generation of the active signal.

26. The method as claimed in claim 25, wherein after the step of generating the active signal, further comprising generating the active signal after receiving the control signal having at least one signal edge.

27. The method as claimed in claim 23, wherein the control signal has a first voltage level and a second voltage level, wherein the first voltage level is different from the second voltage level.

28. The method as claimed in claim 27, wherein the step of generating the control signal further comprises:

generating a pulse signal based on the first voltage level and the second voltage level of the control signal;

generating the active signal when the pulse signal comprise at least one signal edge; and generating the reset signal when receiving the active signal.

\* \* \* \* \*